(12) United States Patent
Brun

(10) Patent No.: US 7,062,900 B1
(45) Date of Patent: Jun. 20, 2006

(54) SINGLE WHEEL RADIAL FLOW GAS TURBINE

(75) Inventor: Klaus Brun, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 89 days.

(21) Appl. No.: 10/790,873

(22) Filed: Mar. 2, 2004

Related U.S. Application Data

(60) Provisional application No. 60/482,671, filed on Jun. 26, 2003.

(51) Int. Cl.
*F02C 3/16* (2006.01)

(52) U.S. Cl. .................... 60/39.35; 60/39.43; 60/39.55

(58) Field of Classification Search ............... 60/39.34, 60/39.35, 39.43, 39.55
See application file for complete search history.

(56) References Cited

U.S. PATENT DOCUMENTS

| | | | |
|---|---|---|---|
| 1,061,142 A | 5/1913 | Tesla | |
| 1,061,206 A | 5/1913 | Tesla | |
| 3,015,211 A | 1/1962 | Luttrell | |
| 3,269,120 A | 8/1966 | Sabatiuk | |
| 4,086,760 A | 5/1978 | Chute | |
| 5,560,196 A * | 10/1996 | Schlote | 60/39.35 |
| 5,636,509 A * | 6/1997 | Abell | 60/39.35 |
| 6,032,458 A * | 3/2000 | James | 60/39.43 |
| 6,047,540 A | 4/2000 | Dev | |
| 6,050,775 A | 4/2000 | Erdmann et al. | |
| 6,192,670 B1 | 2/2001 | Kerrebrock | |
| 6,430,917 B1 | 8/2002 | Platts | |
| 6,682,077 B1 | 1/2004 | Letourneau | |

\* cited by examiner

*Primary Examiner*—Louis J. Casaregola
(74) *Attorney, Agent, or Firm*—Baker Botts L.L.P.

(57) ABSTRACT

A single wheel radial flow gas turbine having a single rotating wheel and a stationary shroud. The wheel has a radial flow compressor section at its inner portion and a turbine section at its outer portion. The compressor and turbine sections are located on the same side of the wheel, which is directly or indirectly coupled to a generator for absorbing the excess rotational energy. A radial flow combustor section and a nozzle section are mounted on the stationary shroud. Air flows radially through the compressor, combustor, nozzle, and turbine sections; there is essentially no axial flow component. Optionally, water may be injected radially downstream from the fuel injectors for power augmentation, $NO_x$ reduction, and metal temperature moderation.

16 Claims, 5 Drawing Sheets

SINGLE WHEEL RADIAL FLOW GAS TURBINE

CROSS-REFERENCE TO RELATED APPLICATION

This application claims the benefit of U.S. Provisional Patent Application No. 60/482,671 filed on Jun. 26, 2003, which is incorporated herein by reference.

BACKGROUND OF THE INVENTION

1. Field of the Invention

This invention relates generally to gas turbines, and more particularly to a single-wheel radial flow gas turbine in which the rotor has a centrifugal compressor and a radial outward flow turbine on the same side of the wheel and in which the stator has a radial flow combustor and nozzle vanes positioned radially between the compressor and the turbine.

2. Description of the Related Art

Industrial gas turbines are commonly employed in applications where high power to weight ratio, low emissions, and high availability requirements prohibit the use of reciprocating engines. For example, in the oil and gas industry, small industrial gas turbines are used for pipeline compression, oil pumping, water injection, gas lift, and offshore platform power generation. Also, in the large electric power plant market, gas turbine combined cycle plants are preferred because of their low air emissions and part load performance. Currently, approximately 40,000 industrial gas turbines are installed throughout the world. U.S. Pat. No. 3,015,211 to Luttrell, which is incorporated herein by reference, is an example of a gas turbine device.

Simple cycle gas turbines consist of three principal components: a compressor, a combustor, and a turbine. The compressor ingests and compresses ambient air, the combustor heats that air by fuel combustion, and the turbine expands the resulting hot air to generate mechanical shaft output power. This open thermodynamic compression-combustion-expansion process is also called the Brayton thermodynamic cycle. Brayton cycle industrial gas turbines are widely used in applications ranging from power generation to gas compression.

Modern small industrial gas turbines are technically complex machines, consisting of multiple rotating parts, bearings, seals, lube oil systems, and sophisticated electronic controls. Most gas turbines above 500 kW output power employ axial compressor and axial turbine design; i.e., the airflow follows primarily along the direction of the axis of the gas turbine shaft. This type of design is a direct evolution from the airplane jet engine and clearly provides the highest aerodynamic efficiency. However, the axial design does not provide lowest weight, small dimensions, portability, or ease of maintenance. As a matter of fact, modern axial flow gas turbines are so technically sophisticated that a user cannot perform even the most basic repairs, diagnostics, and trouble shooting without the gas turbine manufacturer's participation. Additionally, although they are optimized for highest efficiency, most modern gas turbines do not allow use of a wide range of fuels and cannot handle severe environmental conditions. Portability, fuel flexibility, and ruggedness are sacrificed for efficiency. While this may be desirable for most permanently installed large power plant applications, it is not practical for small portable power generation applications.

For smaller power applications (for instance, less than about 500 kW), existing gas turbines often employ a centrifugal compressor, a 180° flow turning combustor, and a radial inflow turbine. Such gas turbines are often called radial flow or centrifugal turbines. Such conventional radial flow gas turbines are more compact than axial flow gas turbines, but because of their 180° flow turning combustors, they are very complex and expensive to manufacture and they are somewhat intolerant to rugged environmental operating conditions.

For a number of industrial applications, customers desire simple, low cost gas turbines that can function under very rugged environmental conditions, are easy to repair or replace, can be operated by personnel with minimal training, are portable, and can handle a wide variety of fuel sources. Such applications include upstream oil production and military power generation. Thus, a need currently exists for a lightweight, small, portable, and rugged gas turbine that can provide a very simple power generation alternative. It would be a significant advancement in the art to provide a gas turbine that incorporates only one rotating part and has no lube oil or sealed gas requirements so that manufacturing, maintenance, repair, and replacement costs are low. Such a design would be highly portable, able to operate in rugged environments on a wide range of fuels, and tolerant of ingestion of large particle matter such as sand or dirt.

SUMMARY OF THE INVENTION

A single wheel radial flow gas turbine in accordance with the present invention comprises a single rotor wheel having a centrifugal flow compressor section at its inner portion and a centrifugal radially outward flow turbine section at its outer portion. The compressor and turbine sections are located on the same side of the wheel. The wheel, which is preferably in the form of a relatively thin disk, is directly coupled to a generator/starter. A radially outward flow combustor section and a nozzle section are mounted on the interior of a stationary shroud facing the wheel.

The air flow through the gas turbine of the present invention is generally radial. Air flow enters the gas turbine axially through an opening in the central portion of the shroud, then the air is turned radially outward through the centrifugal compressor. From the compressor section, the air flow enters the stationary radial combustion section where it is heated using direct combustion via fuel injectors. If desired, water may be injected radially downstream from the fuel injectors to achieve significant power augmentation, $NO_x$ reduction, and metal temperature moderation. Stationary nozzle vanes radially downstream from the combustion section then turn the air flow sharply toward the tangential direction and direct the flow onto turbine blades in the turbine section in order to drive the wheel, and the excess rotational energy (power) is absorbed by the generator.

It is an object of the present invention to provide a simple, compact, inexpensive gas turbine.

It is another object of the present invention to provide a highly portable gas turbine.

It is a further object of the present invention to provide a gas turbine that is capable of operating on a wide range of fuels.

It is another object of the present invention to provide a gas turbine that is capable of operating in rugged environments.

It is yet another object of the present invention to provide a gas turbine with a high tolerance for ingestion of particles such as sand and dirt.

It is still another object of the present invention to provide a gas turbine that is relatively lightweight but generates relatively high power.

It is another object of this invention to provide a gas turbine that is easy to manufacture and maintain.

Further objects and advantages of the present invention will be readily apparent to those skilled in the art from the following detailed description taken in conjunction with the annexed sheets of drawings, which illustrate a preferred embodiment of the invention.

DETAILED DESCRIPTION OF A PREFERRED EMBODIMENT

Figure 1:
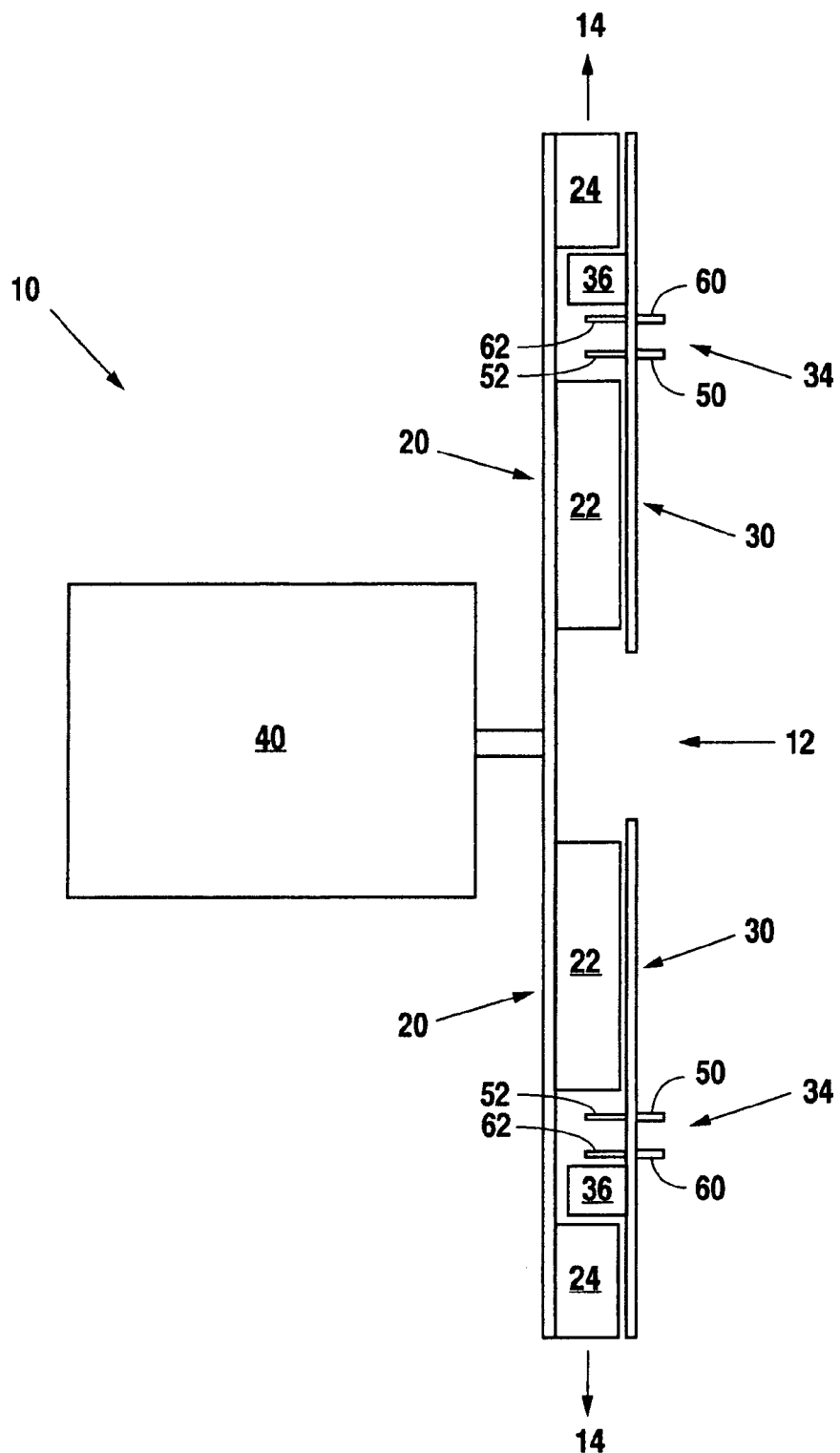
FIG. 1 is a schematic side view of a single wheel radial flow gas turbine in accordance with the present invention.

Referring to FIG. 1, a single wheel radial flow gas turbine 10 in accordance with the present invention comprises a rotor or wheel 20, which is connected to a generator/starter 40 either directly or via a gear, and a stationary shroud 30. Wheel 20 is preferably in the form of a relatively thin disk. Fuel injector ducts 50 provide fuel into gas turbine 10 through shroud 30 via fuel injectors 52. Water injection ducts 60 may also be provided to introduce water through water injection nozzles 62 radially downstream from fuel injector ducts 50. As discussed further below, air flows into turbine 10 axially as indicated by arrow 12 and then flows radially outward as indicated by arrow 14.

Figure 2:
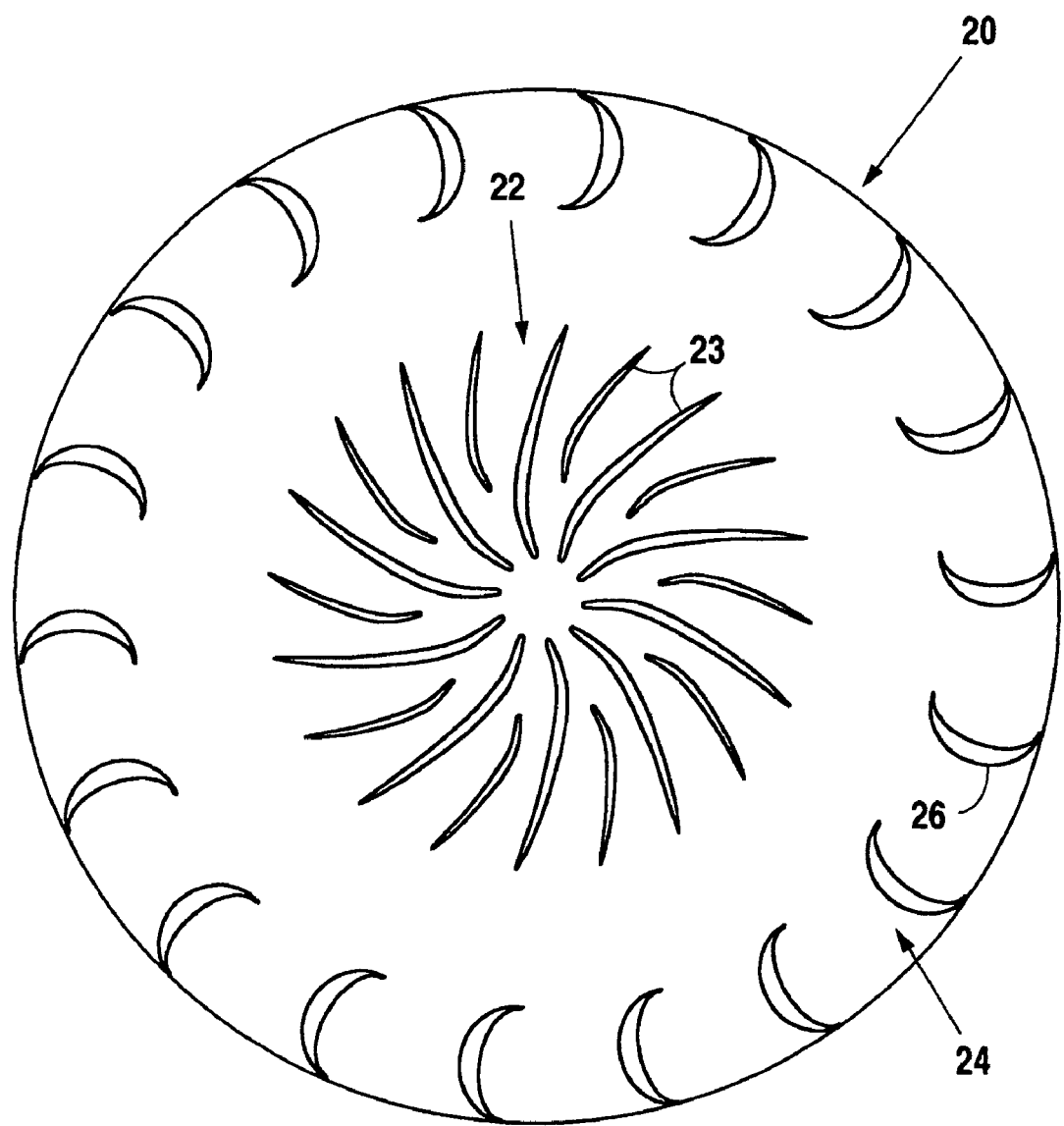
FIG. 2 is an axial view of the rotating wheel of the gas turbine of FIG. 1.
Figure 3:
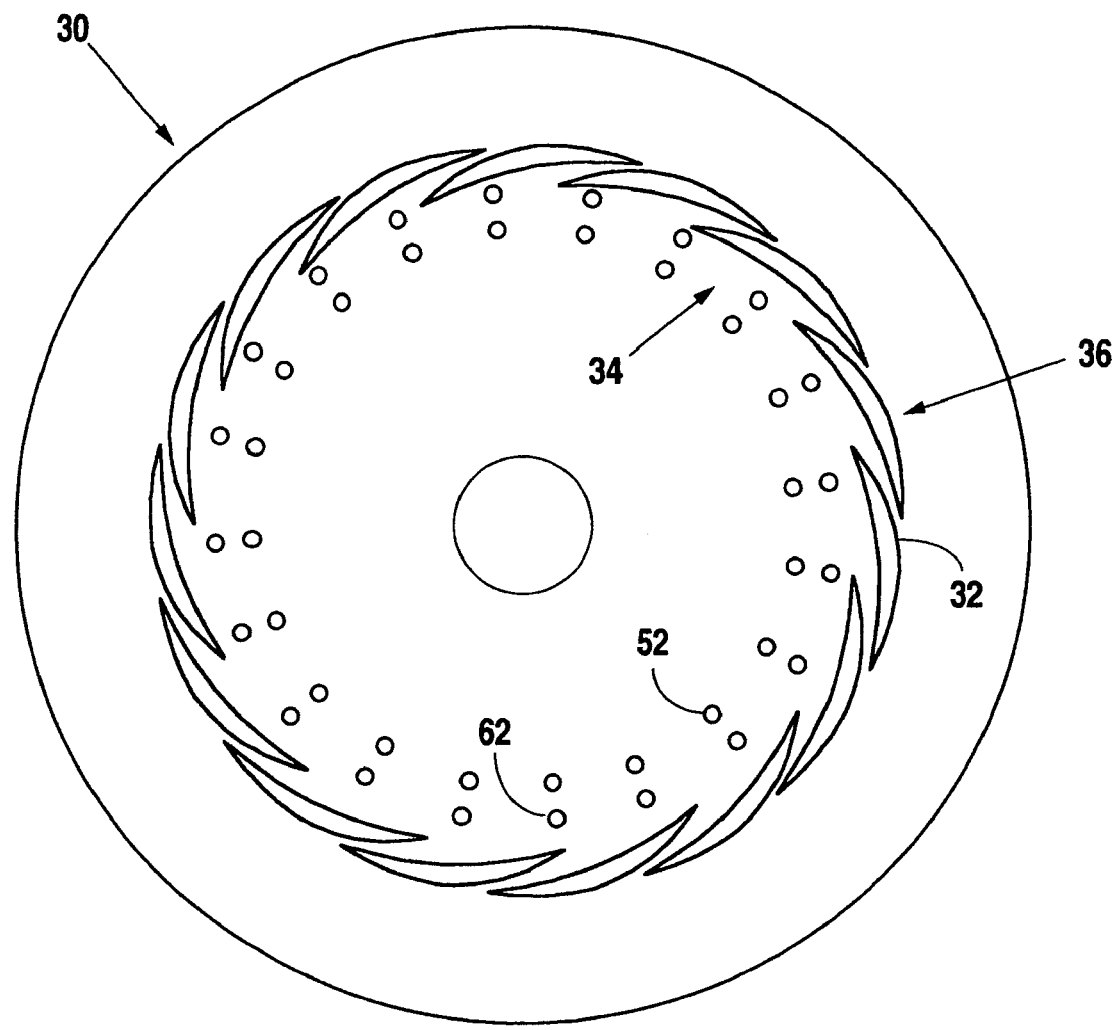
FIG. 3 is an axial view of the stationary shroud of the gas turbine of FIG. 1.
Figure 4:
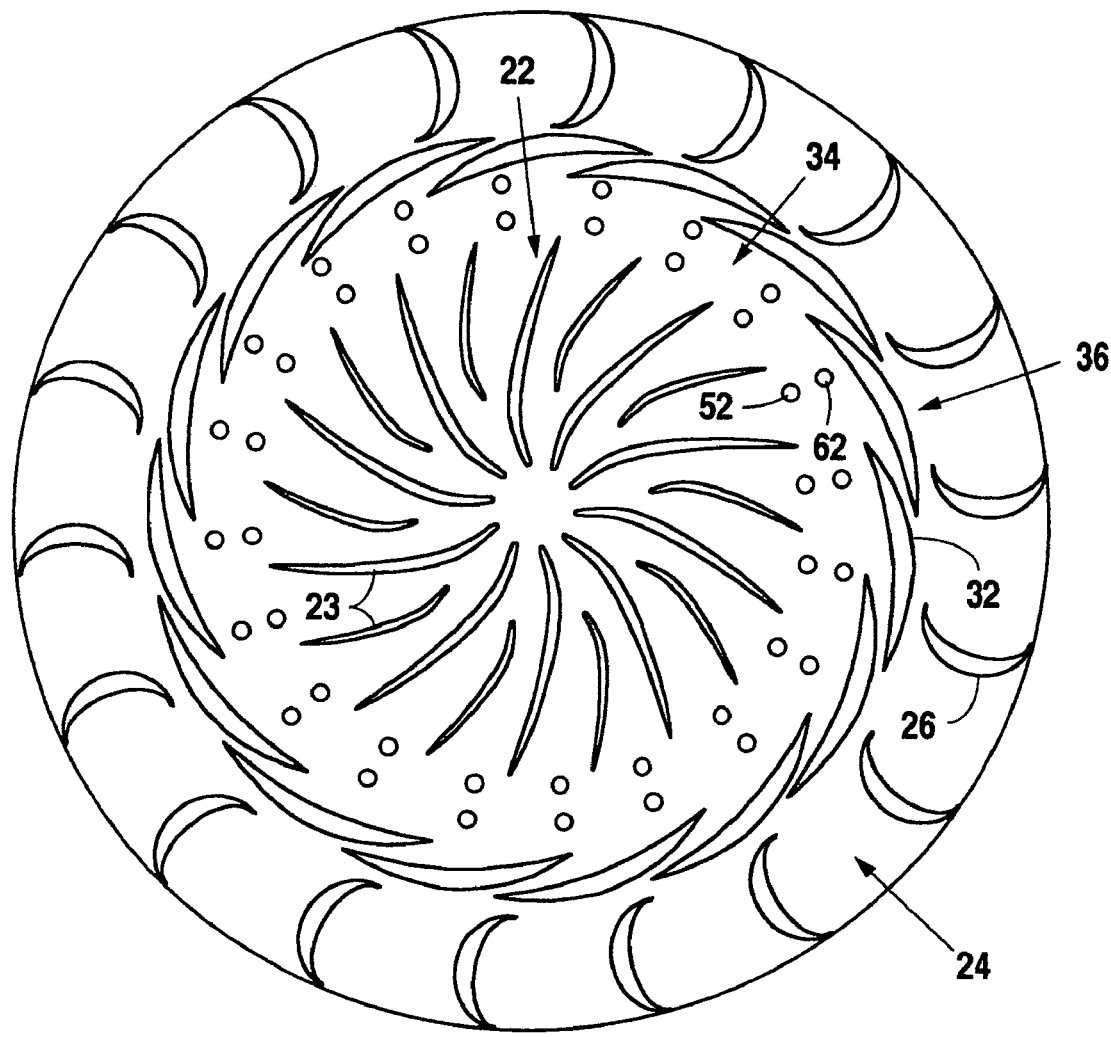
FIG. 4 is an axial view of the rotating wheel and the stationary shroud of the gas turbine of FIG. 1.

As shown in FIGS. 1 and 2, rotating wheel 20 has a compressor section 22 with compressor blades 23 on its inner portion and a turbine section 24 with turbine blades 26 about its perimeter. As seen in FIGS. 1 and 3, stationary shroud 30 has a combustor section 34 and a nozzle section 36 with a plurality of nozzle vanes 32. In combustor section 34, multiple fuel injectors 52 are provided radially upstream from nozzle vanes 32. Optionally, one or more water injection nozzles 62 may be provided radially outward (downstream) from fuel injectors 52 for increased power. FIG. 4 shows the relationship of compressor section 22, combustor section 34, nozzle section 36, and turbine section 24 when wheel 20 and shroud 30 are assembled. It will be appreciated that FIGS. 2–4 are depicted from the same axial perspective as if it were possible to look through the structure of either wheel 20 or shroud 30.

Figure 5:
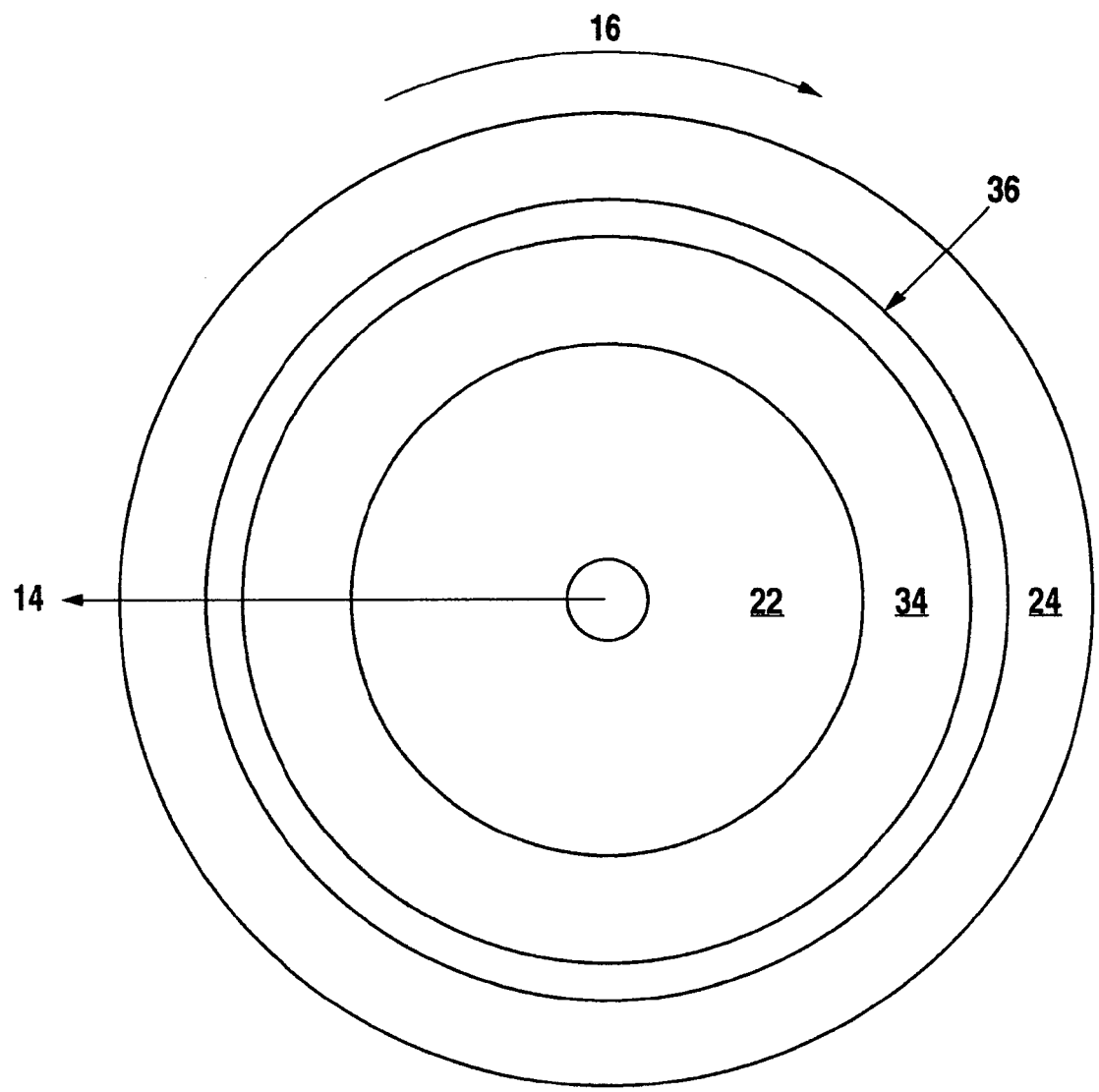
FIG. 5 is a schematic axial view showing the general direction of airflow through the gas turbine of FIG. 1.

Referring to FIGS. 1, 4 and 5, air flow enters the centrifugal compressor 22 axially as shown by arrow 12, then the air is turned radially outward through centrifugal compressor 22. From compressor section 22, the air flow enters the stationary radial combustion section 34 where it is heated using direct combustion via fuel injectors 52. If desired, water may be injected through nozzles 62 to achieve significant power augmentation, $NO_x$ reduction, and metal temperature moderation. Stationary nozzle vanes 32 of nozzle section 36 then turn the air flow sharply toward the tangential direction and direct the flow onto turbine blades 26 of turbine section 24 in order to drive wheel 20 in rotation as indicated by arrow 16. Persons skilled in the art will appreciate that the various components of wheel 20 and shroud 30 may be configured in a reciprocal manner to that shown in order to produce rotation in the opposite direction. Turbine blades 26 are preferably of the impulse type, but turbine blades 26 may also be of other known types. The air flow exits gas turbine 10 radially as shown by arrow 14. Thus, there is no 180° flow turning as is required in conventional centrifugal gas turbines. The excess rotational energy (power) is absorbed by generator 40, which is directly coupled to wheel 20 or indirectly coupled to wheel 20 via a gear. Generator 40 also acts as a starter motor to support the turbine.

Alternatively, the rotating wheel of the present invention may be divided into compressor and turbine sections and mounted on a planetary gearbox. In this alternative embodiment, the compressor is geared to the turbine via the planetary gearbox to allow for different rotational speeds of the turbine and the compressor. This configuration allows for optimized speed matching and/or counter-rotating blades but makes the construction more complex.

Thus, it is seen that the present gas turbine 10 is a single wheeled gas turbine comprising a centrifugal compressor 22 mounted on a rotating wheel 20, a radial outward flow combustor 34 and a nozzle 36 mounted on a stationary shroud 30, and a centrifugal radially outward flow turbine 24 mounted on the rotating wheel 20. The compressor 22 and the turbine 24 are located on the same side (the interior side) of the rotating wheel 20, while the combustor 34 and the nozzle 36 are mounted on the stationary shroud 30. Gas turbine 10 thus comprises only two relatively easy to manufacture primary components: the rotating compressor-turbine wheel 20 that is directly coupled to the generator/starter motor 40, and the combustor-nozzle shroud 30 that has all the desired utility line (fuel and water) connections. The compressor 22, combustor 34, nozzle 36, and turbine 24 sections are aerodynamically radial in line.

A single wheel radial flow gas turbine 10 in accordance with the present invention thus provides a number of advantages, including: (1) a mechanically very simple, compact, and portable gas turbine with only one rotating part; (2) a short axial length with essentially no axial flow component; (3) no internal bearings or gears; (4) no lube oil cooling or seal buffer gas requirements; (5) high tolerance to ingestion of particulate matter; (6) simple two-part construction with low manufacturing and maintenance costs; (7) capacity for a high volume of direct water injection for significant power augmentation; and (8) capability of running as a simple cycle gas turbine or in steam/gas turbine mixed flow mode. As such, the present single wheel radial flow gas turbine 10 is ideal for small portable prime mover applications used in rugged environments, such as oil and gas fields and military field operations.

Although the foregoing specific details describe a preferred embodiment of this invention, persons reasonably skilled in the art will recognize that various changes may be made in the details of this invention without departing from the spirit and scope of the invention as defined in the appended claims (as such claims may hereafter be amended). Therefore, it should be understood that this invention is not to be limited to the specific details shown and described herein.

I claim:

1. A radial flow gas turbine comprising:
  a rotatable wheel having an interior side;
  a centrifugal compressor section disposed on said interior side of said wheel;

wherein the compressor section comprises a spoked pattern of fins, each fin being a continuous raised fin extending alone a radius of the rotatable wheel, such that a substantially linear and uninterrupted channel is formed between each successive fin;

a radial outward flow turbine section disposed on said interior side of said wheel, said turbine section being located radially outward from said compressor section; and a stationary shroud having a combustor section and a nozzle section disposed radially between said compressor section and said turbine section.

2. The gas turbine of claim 1 further comprising a generator/starter coupled to said wheel for starting said gas turbine and absorbing energy from said wheel.

3. The gas turbine of claim 1 wherein said combustor section comprises at least one water injector radially downstream from said at least one fuel injector.

4. A radial flow gas turbine consisting essentially of:

a single, rotatable wheel having an interior side;

a centrifugal compressor section disposed on said interior side of said wheel;

wherein the compressor section comprises a spoked pattern of primary fins, each primary fin extending in a continuous direction alone a radius of the rotatable wheel such that the primary fins form a single concentric row;

a radial outward flow turbine section disposed on said interior side of said wheel, said turbine section being located radially outward from said compressor section; and a stationary shroud having a radial flow combustor section and a nozzle section disposed radially between said compressor section and said turbine section.

5. The gas turbine of claim 1, wherein the fins are arranged such that a particle entering the gas turbine at the midpoint of the rotatable wheel will follow a substantially spiral path through the compressor section.

6. The gas turbine of claim 5, wherein the spiral path does not deviate from the direction of rotation of the wheel during operation of the gas turbine.

7. The gas turbine of claim 1, wherein the fins are arranged in a single concentric row.

8. The gas turbine of claim 1, wherein the fins are of varying lengths.

9. The gas turbine of claim 1, wherein the turbine comprises a concentric pattern of impulse type turbine blades.

10. The gas turbine of claim 1, further comprising fuel injectors attached to the shroud.

11. The gas turbine of claim 4, wherein the fins are arranged such that a particle entering the gas turbine at the midpoint of the rotatable wheel will follow a substantially spiral path through the compressor section.

12. The gas turbine of claim 11, wherein the spiral path does not substantially deviate from the direction of rotation of the wheel during operation of the gas turbine.

13. The gas turbine of claim 4, wherein the fins are of varying lengths.

14. The gas turbine of claim 4, wherein the turbine comprises a concentric pattern of impulse type turbine blades.

15. The gas turbine of claim 4, further comprising fuel injectors attached to the shroud.

16. The gas turbine of claim 4, wherein the turbine has a second set of fins interposed between said primary fins.

* * * * *